US009121929B2

(12) United States Patent
Okamura et al.

(10) Patent No.: US 9,121,929 B2
(45) Date of Patent: Sep. 1, 2015

(54) POSITION OUTPUT DEVICE USING SATELLITE NAVIGATION SYSTEM

(71) Applicant: TOKYO KEIKI INC., Tokyo (JP)

(72) Inventors: Nobuyuki Okamura, Tokyo (JP); Hiroomi Arakane, Tokyo (JP); Takao Sagawa, Tokyo (JP)

(73) Assignee: TOKYO KEIKI INC., Tokyo (JP)

( * ) Notice: Subject to any disclaimer, the term of this patent is extended or adjusted under 35 U.S.C. 154(b) by 0 days.

(21) Appl. No.: 14/363,680

(22) PCT Filed: Dec. 6, 2012

(86) PCT No.: PCT/JP2012/081635
§ 371 (c)(1),
(2) Date: Jun. 6, 2014

(87) PCT Pub. No.: WO2013/084987
PCT Pub. Date: Jun. 13, 2013

(65) Prior Publication Data
US 2014/0365117 A1  Dec. 11, 2014

(30) Foreign Application Priority Data

Dec. 9, 2011  (JP) .................................. 2011-270640

(51) Int. Cl.
| | |
|---|---|
| *G01C 21/00* | (2006.01) |
| *G01S 1/00* | (2006.01) |
| *G01S 5/02* | (2010.01) |
| *G01S 19/00* | (2010.01) |
| *G01C 21/16* | (2006.01) |
| *G01S 19/49* | (2010.01) |
| *G01S 19/42* | (2010.01) |

(52) U.S. Cl.
CPC ................ *G01S 19/00* (2013.01); *G01C 21/16* (2013.01); *G01S 19/426* (2013.01); *G01S 19/49* (2013.01)

(58) Field of Classification Search
CPC ......... G01S 19/00; G01S 19/07; G01S 19/40; G01S 19/41; G01S 19/47; G01S 19/49; G01S 5/021; G01C 21/16
USPC ................................................. 701/455, 469
See application file for complete search history.

(56) References Cited

U.S. PATENT DOCUMENTS

2008/0077322 A1* 3/2008 Sumizawa ..................... 701/210
2010/0117895 A1* 5/2010 Mizuochi et al. .......... 342/357.02
2012/0116676 A1* 5/2012 Basnayake et al. ............ 701/469

FOREIGN PATENT DOCUMENTS

JP  01-148984 A  6/1989
(Continued)

OTHER PUBLICATIONS

International Search Report dated Feb. 26, 2013 in International Patent Application No. PCT/JP2012/081635.
(Continued)

*Primary Examiner* — Imran Mustafa
(74) *Attorney, Agent, or Firm* — McGinn IP Law group, PLLC

(57) ABSTRACT

A position output device for outputting position data indicating a current position of an object, is based on position data of a determined current position of the object as determined by a satellite navigation system. When a position jump has occurred in the position data from the satellite navigation system, an appropriate current position is outputted. An estimated current position is generated based on the output position outputted at the latest update time. It is determined whether or not a position jump has occurred, based on the distance between the estimated position and the satellite navigation system-based determined position, which is being updated by the satellite navigation system. When it is determined that a position jump has occurred, a position adjustment vector is generated by calculation, which is then used to generate an adjusted position.

16 Claims, 10 Drawing Sheets

(56) References Cited

FOREIGN PATENT DOCUMENTS

| | | |
|---|---|---|
| JP | 08-313278 A | 11/1996 |
| JP | 2812795 B2 | 10/1998 |
| JP | 2006-162292 A | 6/2006 |
| JP | 3984112 B2 | 10/2007 |
| JP | 2009-097898 A | 5/2009 |

OTHER PUBLICATIONS

European Search Report dated Jul. 1, 2015.
Spangenberg, Mariana, et al. "Detection of Variance Changes and Mean Value Jumps in Measurement Noise for Multipath Mitigation in Urban Navigation", Journal of The Institute of Navigation, vol. 57, No. 1, 2010 (pp. 35-52).

* cited by examiner

Satellite navigation system

POSITION OUTPUT DEVICE USING SATELLITE NAVIGATION SYSTEM

TECHNICAL FIELD

The present invention relates to a position output device for outputting the current position of a moving object based on the determined current position of the moving object as determined by a satellite navigation system.

BACKGROUND OF THE INVENTION

In recent years, the precision of the determined current position as determined by a satellite navigation system, such as GPS, has been improving rapidly. The improvement is not only contributed by the improvement in the precision of the GPS receivers but also highly contributed by the use of an augmentation system for the satellite navigation system, such as Multi-functional Transport Satellite (MTSAT) Satellite-based Augmentation System (MSAS).

Nevertheless, the position information provided by a satellite navigation system is still subject to the problem of a position jump, which is an abrupt change in the determined current position of a targeted moving object that may be caused by, for example, an interruption of reception of the signals from the satellites, due to possible interference by trees, buildings or other obstacles. The position jump may be also caused by a multipath effect of the signals from the satellites, a satellite change, or others.

There is also known an inertial navigation system, which is a standalone navigation system using sensors such as accelerometers, gyroscopes, and/or geomagnetic direction sensors, in order to determine the position of a moving object. Inertial navigation systems, however, are subject to a disadvantage in that sensor errors may build up in the process of integration calculation process required for their operations. It would be costly to improve the precision of the sensors, although it may be effective to reduce the sensor errors.

In order to remedy the disadvantages accompanied with the two different types of navigation systems, i.e., the satellite navigation system and the inertial navigation system, there have been proposed various position determination systems utilizing the two different systems so as to generate adjusted position for the current position of the targeted moving object.

Patent publication No. 1 discloses a position determination system of such kind. With this position determination system, it is determined whether or not the positioning process being performed by a GPS receiver is effective. If it is effective, then both the GPS-based determined current position and the inertia-based determined current position are fetched into the system. Then, the difference (or the distance) between a new GPS-based determined current position and the previously GPS-based determined current position is compared with a predetermined threshold. If it is greater than the threshold, the new GPS-based determined current position is deemed as a false position. Also, the difference (or the distance) between a new inertial system-based determined current position and the previous inertial system-based determined current position is compared with a predetermined threshold. If it is greater than the threshold, the new inertial system-based determined current position is deemed as a false position. If the determined current position as determined by one of the two navigation systems is deemed as a false one, the determined current position as determined by the other navigation system is used for navigation purpose. If the difference between the new and the previous determined current positions is smaller than the threshold for each navigation system, one of the newly-determined determined current positions may be selected to be used for navigation purpose, or the average between them may be used for the purpose.

Patent publication No. 2 discloses a navigation method, in which map-matching is performed based on a standalone navigation system. When the map-matching cannot be performed based on the standalone navigation system, then vehicle position data provided by GPS is used to correct vehicle position data derived from the standalone navigation system.

Patent publication No. 3 discloses a solution of the problem of the position jump accompanied with satellite navigation system, in which the solution does not require an aid of any inertial navigation system. According to the solution, it is determined whether or not a position jump has occurred in the newly-provided determined current position of a moving object as determined by the satellite navigation system. If not, then a certain adjustment is effected to the newly-determined current position of the moving object based on an estimated current position of the moving object, and the adjusted position is outputted as an output position. Otherwise, i.e., if it is determined that a position jump has occurred, then, either the estimated current position or the newly-determined current position is used as a new output position.

PRIOR ART DOCUMENTS

Patent Publications

Patent publication No. 1: The publication of Japanese patent No. 2812795

Patent publication No. 2: The publication of Japanese patent No. 3984112

Patent publication No. 3: Japanese patent application publication No. 2009-97898

SUMMARY OF THE INVENTION

Problems to be Solved by the Invention

Nevertheless, conventional position adjustment methods are subject to a problem in that an adjustment to the determined current position can cause an abrupt change in the outputted position if a position jump has occurred in the determined current position as determined by the satellite navigation system.

Further, conventional position adjustment methods are subject to an additional problem in that the determined current position provided by the satellite navigation system may include a relatively long delay. This is due to the fact that a satellite navigation system generally has a longer update duration of the position data than an inertial navigation system. This problem is particularly troublesome when the position of the moving object changes acutely.

The present invention has been achieved in view of the above problems. Accordingly, it is a first object of the present invention to provide a position output device using a satellite navigation system, which is capable of outputting an appropriate current position data of a moving object even when a position jump has occurred in the position data from the satellite navigation system.

Further, it is a second object of the present invention to provide a position output device using a satellite navigation system, which is capable of outputting an appropriate current position data of a moving object by correcting position errors in the position data from the satellite navigation system with the use of the position data from an inertial navigation system. Resolution According to the present invention, the above objects are achieved by a position output device for outputting position data indicating a current position of an object, based on position data of a determined current position of the object as determined by a satellite navigation system, comprising:

a satellite navigation system-based data fetcher for fetching, into the position output device, a satellite navigation system-based determined current position which is being updated by the satellite navigation system;

an output position calculator for successively generating, by calculation, an output position to be outputted at each successive update time;

an estimated current position calculator for generating, by calculation, an estimated current position of the object, based on the latest output position outputted at the latest update time;

a position jump occurrence determinator for determining whether or not a position jump has occurred, based on the distance between the estimated current position and the satellite navigation system-based determined current position;

a position adjustment vector calculator for generating, by calculation, a position adjustment vector for use in effecting adjustment to the satellite navigation system-based determined current position, the position adjustment vector calculator being adapted to be activated when it is determined that a position jump has occurred;

a position return determinator for determining whether or not the distance between the estimated current position and the satellite navigation-system based determined current position is greater than a predetermined threshold distance when it is determined that no position jump has occurred after occurrence of a position jump;

a second position adjustment vector calculator for generating, by calculation, a second position adjustment vector for use in effecting adjustment to the satellite navigation system-based determined current position, the second position adjustment vector calculator being adapted to be activated when it is determined that the distance between the estimated current position and the satellite navigation-system based determined current position is greater than the predetermined threshold distance;

the position adjustment vector calculator being adapted to generate the position adjustment vector having a magnitude of such a length: if the distance between the estimated current position and the satellite navigation system-based determined current position is reduced by this length at each successive update time, then that distance is reduced to zero after a predetermined time period which is longer than the update interval;

the second position adjustment vector calculator being adapted to generate the second position adjustment vector having a magnitude of such a length: if the distance between the estimated current position and the satellite navigation system-based determined current position is repetitively reduced by this length at each successive update time, then that distance is reduced to zero after a predetermined time period which is longer than the update interval and shorter than the above mentioned predetermined time period for the position adjustment vector calculator; and the output position calculator being adapted to generate such an output position that corresponds to the estimated current position adjusted with the position adjustment vector when it is determined that a position jump has occurred and to generate such an output position that corresponds to the estimated current position adjusted with the second position adjustment vector when it is determined that no position jump has occurred after occurrence of a position jump and that the distance between the estimated current position and the satellite navigation-system based determined current position is greater than a predetermined threshold distance.

The position adjustment vector may have a magnitude which corresponds to the distance between the estimated current position and the satellite navigation system-based determined current position, multiplied by the quotient of the length of the update interval divided by the length of a first time period.

The second position adjustment vector may have a magnitude which corresponds to the distance between the estimated current position and the satellite navigation system-based determined current position, multiplied by the quotient of the length of the update interval divided by the length of a second time period, wherein the second time period is shorter than the first time period.

The position output device may further comprises an inertial navigation system-based data fetcher for fetching, into the position output device, an inertial navigation system-based determined velocity which is being updated by the inertial navigation system. the estimated current position calculator may be adapted to generate, by calculation, the estimated current position based on the inertial navigation system-based determined velocity.

The output position calculator may be adapted to use the estimated current position as a new output position when it is determined that no position jump has occurred while the satellite navigation system-based determined position has not been updated.

The output position calculator may be adapted to use the estimated current position as a new output position when it is determined that no position jump has occurred while the satellite navigation system-based determined position has been updated.

Advantages provided by the invention

According to the present invention, when it is determined that a position jump has occurred, a position adjustment vector is used for position adjustment, so that the output position is made to approach, in a gradual manner, to the satellite navigation system-based determined position over a time period longer than the update interval, and thus the output position is kept from changing abruptly.

EXEMPLARY MODE FOR CARRYING OUT THE INVENTION

Hereinafter; several embodiments of the present invention will be described in detail.

(First Embodiment)

Figure 1:
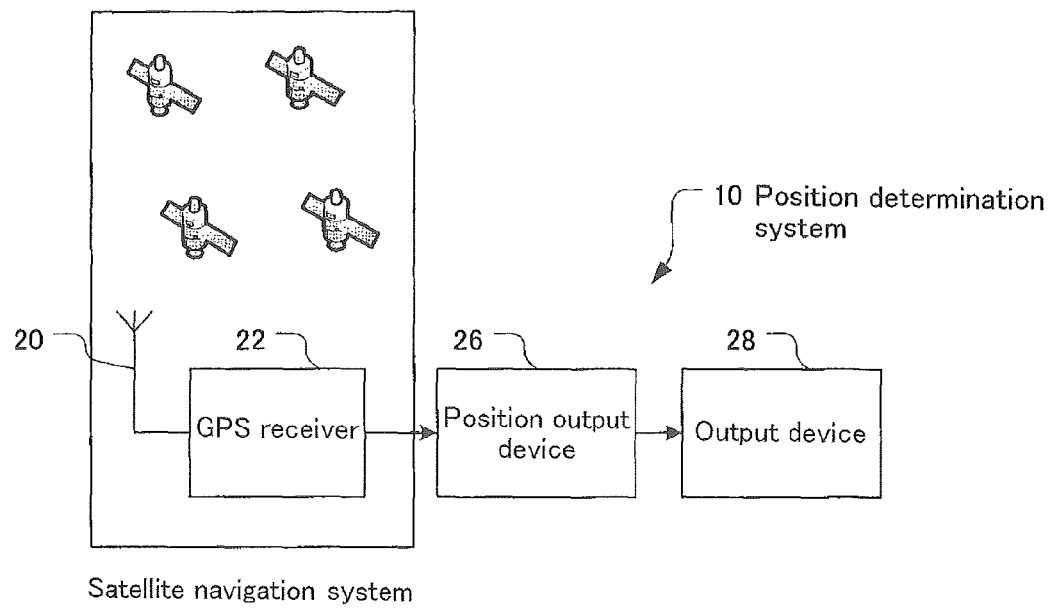
FIG. 1 is a block diagram showing a position determination system including a position output device in accordance with a first embodiment of the present invention.
Figure 2:
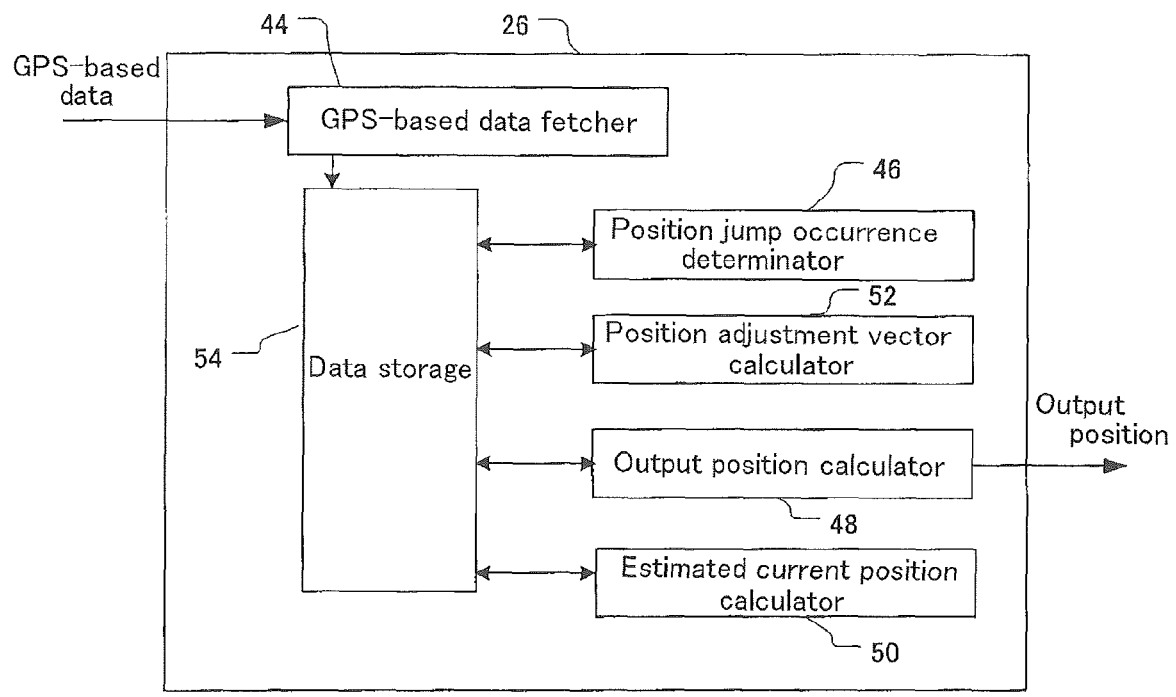
FIG. 2 is a block diagram showing the position output device in accordance with the first embodiment of the present invention.

As shown in FIG. 1, a position determination system includes a position output device in accordance with the embodiment. The position determination system is adapted to be mounted on a moving object, which may be movable either in a two-dimensional area or in a three-dimensional space.

Generally, the position determination system 10 includes a GPS antenna 20 and a GPS receiver 22, both of which are components of a satellite navigation system. The position determination system 10 further includes the position output device 26 and an output device 28. The output device 28 may be, for example, a display device, a recording device, or any other devices which utilize the outputs of the position output device. The output device 28, however, may be dispensed with.

The GPS receiver 22 repetitively determines and outputs GPS-based data at a fixed update interval $T_{GPS}$ (which may be, for example, about 200 ms), based on the signals transmitted from GPS satellites and received by means of the GPS antenna 20. The GPS-based data includes GPS-based determined current position of a moving object (referred to more simply as the "GPS-based determined current position" hereinafter) and GPS-based determined velocity of the moving object (referred to more simply as the "GPS-based determined velocity $V_{GPS}$" hereinafter).

The position output device 26 receives the GPS-based determined current position from the GPS receiver 22, and may output it as the output position indicating the current position of the moving object, as long as there has not occurred a position jump (or an abrupt change in the GPS-based determined current position), which may occur due to a possible interruption of reception of the signals from the satellites, a possible multipath effect, a satellite change, or others.

In order to avoid adverse effects of such a position jump, the position output device 26 includes a central processing unit (CPU) and a memory in which a software program is installed. With the software program, the position output device 26 provides several functionalities, which are functional components of the position output device 26, including a GPS-based data fetcher 44, a position jump determinator 46, an output position calculator 48, an estimated current position calculator 50, a position adjustment vector calculator 52, and a data storage 54.

Figure 3:
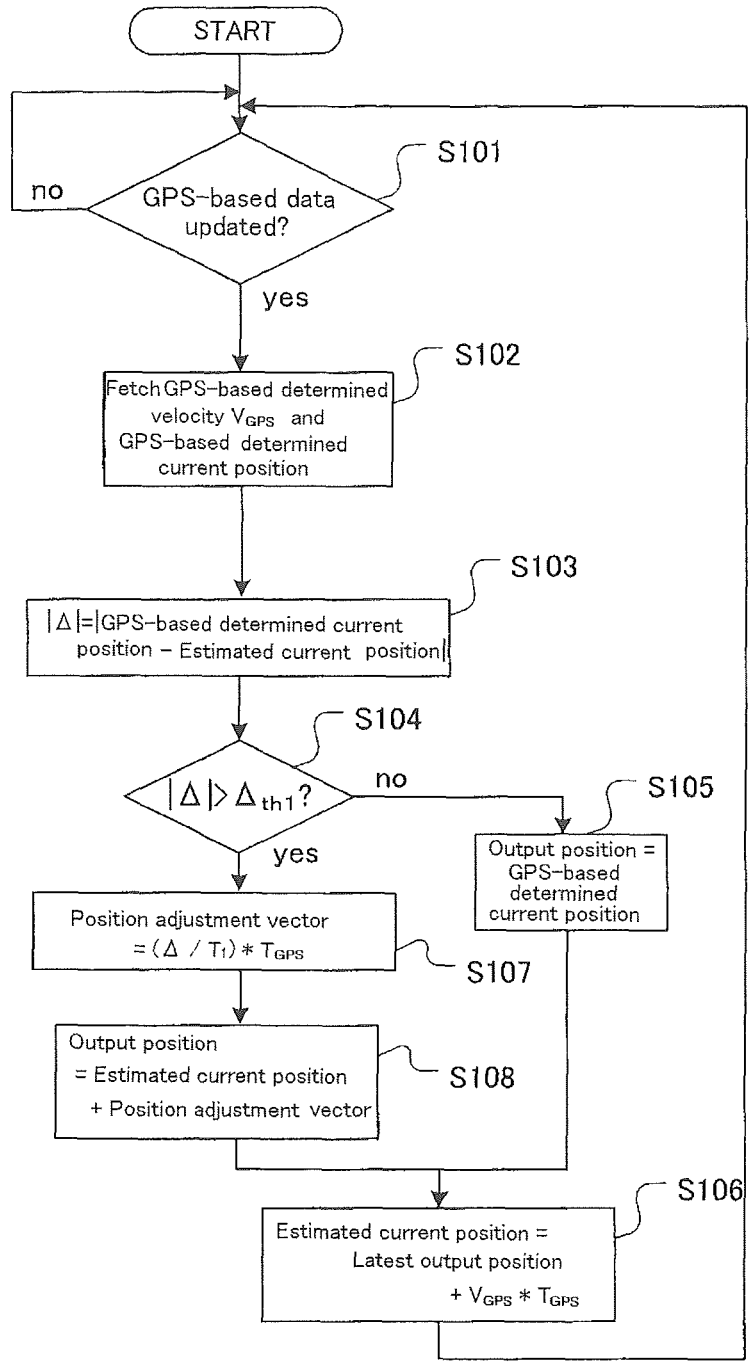
FIG. 3 is a flowchart showing the process performed by the position output device in accordance with the first embodiment.

Referring next to FIG. 3, the processes carried out by the respective functional components 44 through 54 are described hereinafter.

The GPS-based data fetcher 44 fetches the GPS-based data from the GPS receiver 22 into the device and stores it into the data storage 54 (Steps S101 and S102). The GPS-based data includes the GPS-based determined velocity $V_{GPS}$ of the moving object and the GPS-based determined current position of the moving object (referred to more simply as the "satellite navigation system-based determined position" hereinafter), and is being periodically updated at the update interval $T_{GPS}$.

Whenever the GPS-based data from the GPS receiver 22 is updated, it is determined by the position jump determinator 46 whether or not a position jump has occurred at the update. If the new GPS-based determined current position is distant from the latest estimated current position (described later in detail) by a distance greater than a predetermined distance, then it is determined that a position jump has occurred.

More particularly, for example, in this determination process, the distance $|\Delta|$ between the new GPS-based determined current position and the estimated current position is calculated (Step S103), and, if the distance $|\Delta|$ is greater than a predetermined threshold $\Delta_{th1}$ (which may be, for example, some tens of centimeters), then it is determined that a position jump has occurred.

That is, if formula (1) below holds, then it is determined that a position jump has occurred. Otherwise, it is determined that no position jump has occurred.

$$|\Delta| > \Delta_{th1} \qquad (1)$$

If it is determined that no position jump has occurred at the new update (NO branch from Step S104), then the new GPS-based determined current position itself is used by the output position calculator 48 as a new output position, that is, the new GPS-based determined current position is selected to be the new output position (Step S105).

Thereafter, a new estimated current position of the moving object, which may be used at the next update time, is generated by the estimated current position calculator 50 and stored into the data storage 54. The new estimated current position is generated based on the latest output position, the GPS-based determined velocity $V_{GPS}$, and the update interval $T_{GPS}$, by calculation using formula (2) below (Step S106).

$$\text{Estimated current position} = \text{Latest output position} + V_{GPS} * T_{GPS} \qquad (2)$$

Note that the GPS-based determined velocity $V_{GPS}$ in this formula is a vector quantity. Although the new estimated current position is generated based on the latest output position, the GPS-based determined velocity, and the update interval, the latest output position does not exist at the start of operation of the device, when any appropriate position may be used instead of the latest output position, such as the latest GPS-based determined current position.

Referring back to Step S104, if it is determined that a position jump has occurred at the new update (YES branch from Step S104), then the position adjustment vector calculator 52 is activated to generate a position adjustment vector (Step S107). The position adjustment vector is used to effect adjustment to the successive GPS-based determined current positions provided after an occurrence of a position jump, such that those successive GPS-based determined current positions will not be outputted as they are, but will be outputted only after adjustment effected thereto. With the adjustment, the outputted positions will approach to the corresponding GPS-based determined current positions over a length of time $T_1$ (which is, for example, 20 to 30 seconds) greater than the update interval $T_{GPS}$. This adjustment is advantageous because i) a new GPS-based determined current position that has jumped from the previous GPS-based determined current position may be often a false position, it may be often unpreferable to allow an abrupt change to occur between the successive output positions, while it is necessary to cause the output position to be again coincident to the corresponding GPS-based determined current position within a reasonable period of time.

More particularly, the position adjustment vector is so generated as to have a magnitude of such a length: if the distance |Δ| between the estimated current position and the GPS-based determined current position is reduced by this length at each successive update time, then the distance |Δ| is reduced to zero after a first predetermined time period $T_1$ which is longer than the update interval $T_{GPS}$. Accordingly, the position adjustment vector can be generated by calculation using formula (3) below.

$$\text{Position adjustment vector} = (\Delta/T_1) * T_{GPS} \quad (3)$$

Note that Δ in this formula is a vector quantity.

Thereafter, the output position calculator 48 generates a new output position, by calculation based on the latest estimated current position and the position adjustment vector. The new output position corresponds to the position that is advanced from the latest estimated current position by the position adjustment vector (Step S108).

The above process will be iterated at each successive update of the GPS-based data after occurrence of a position jump until the difference |Δ| between the GPS-based determined current position and the estimated current position is reduced below the predetermined threshold distance |Δ| (NO branch from Step S104), when the output position calculator 48 uses the new GPS-based determined current position as the output position, so that the output position is again coincident with the GPS-based determined current position.

Figure 4:
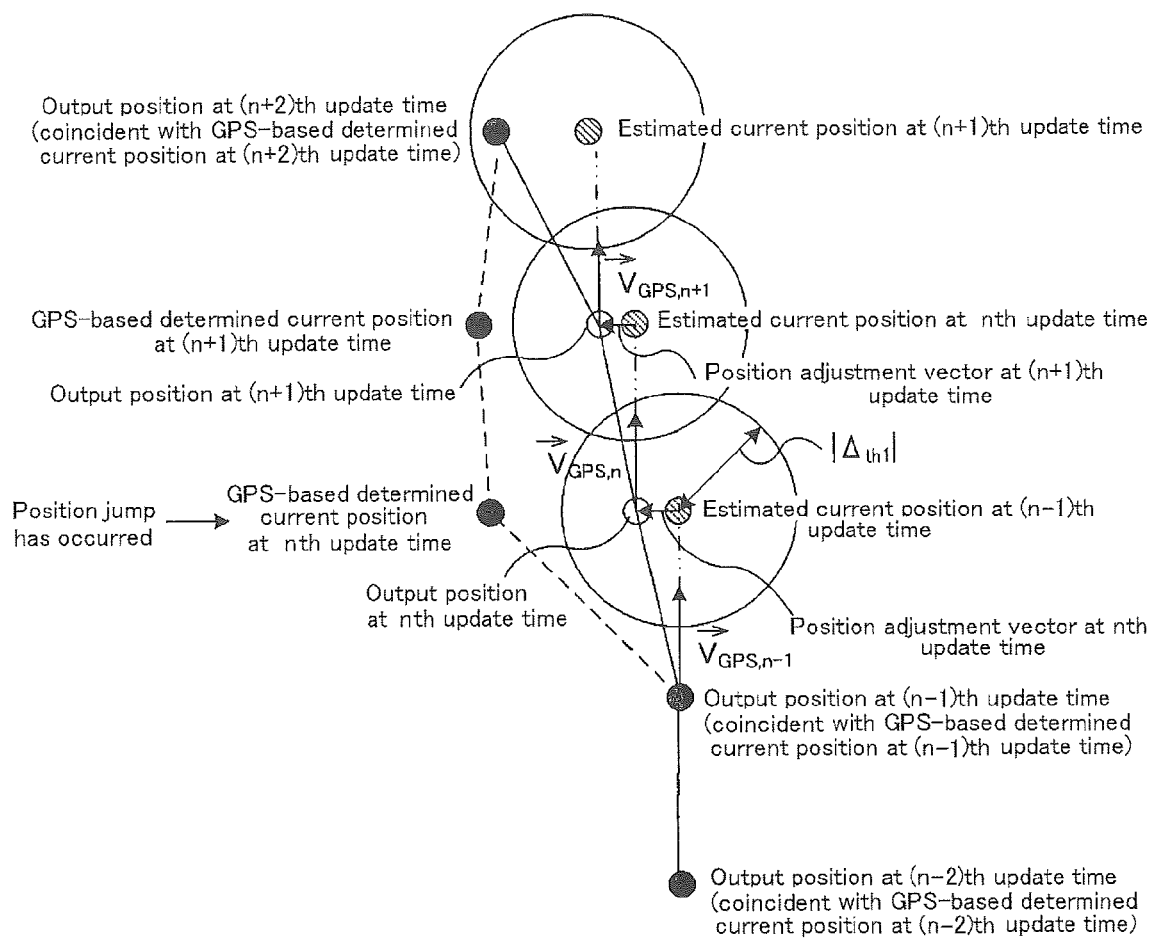
FIG. 4 is a schematic diagram showing an example of successive output positions, which may be outputted from the position output device in accordance with the first embodiment.
Figure 5:
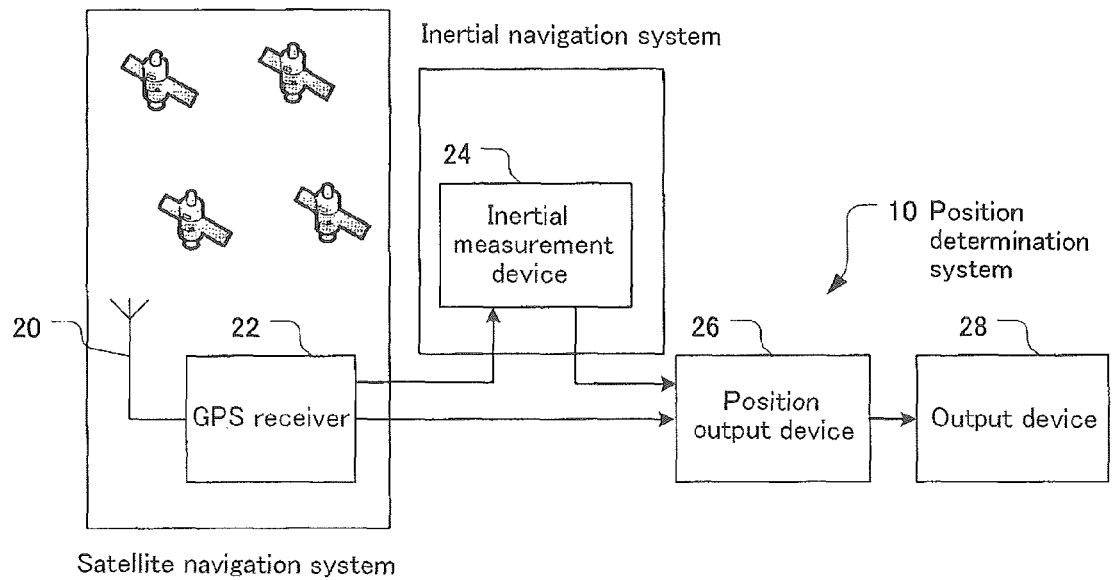
FIG. 5 is a block diagram showing a position determination system including a position output device in accordance with a second embodiment of the present invention.

FIG. 4 shows an example of a series of displacements between successive output positions, which may be obtained by iteration of the above process. In the drawing, (n) is a serial number identifying each particular update of the output position. No position jump has occurred till the nth update, so that GPS-based determined current positions are used as output positions at the preceding updates. At the nth update, a position jump has occurred, so that such a position that is advanced from the latest estimated current position by the position adjustment vector is generated and used as the output position. At the following (n+1)th update, another such a position is generated and used as the output position, which is closer to the corresponding GPS-based determined current position than the preceding output position is. Finally, at the following (n+2)th update, when no longer a position jump has occurred, so that the GPS-based determined current position is again used as the output position.

In this manner, a series of adjusted positions are successively generated after occurrence of a position jump at a certain update of the GPS-based data over a period of time T1 longer than the update interval $T_{GPS}$ for the GPS-based data. By virtue of this, advantageously, the position jump (i.e., an abrupt displacement between two successive GPS-based determined current positions) does not result a corresponding abrupt displacement between two successive output positions. Rather, the successive output positions assume smooth displacements, so that the output position gradually approaches to the GPS-based determined current position in time, which improves the stability of system operation. Alternatively, the position jump determinator 46 may be so constructed as to determine that a position jump has occurred if formula (1) holds for two or more successive updates of the GPS-based data, which ensures more conservative displacement between successive output positions.

As described, in the above embodiment, the estimated current position is generated based on the GPS-based determined velocity. Alternatively, the estimated current position may be generated based on the measured velocity of the moving object which may be obtained by an appropriate sensor, such as a vehicle speed sensor.

(Second Embodiment)

FIGS. 5 through 9 show a second embodiment of the present invention. Among its functional components, those which are the same as or similar to the components of the first embodiment are indicated with the same reference numerals and will not be described in detail.

A typical satellite navigation system has a relatively long update interval of the position data (such as, about 200 ms). Accordingly, if an output position for the current position of a moving object is generated solely based on the satellite navigation system-based determined current position of the object moving at a high speed, it may possibly include a considerable delay.

In view of this, with the second embodiment, an inertial measurement device 24 having a shorter update interval (such as, about 10 ms) is used to interpolate position data between the successive GPS-based determined current positions provided from the GPS receiver 22.

Figure 6:
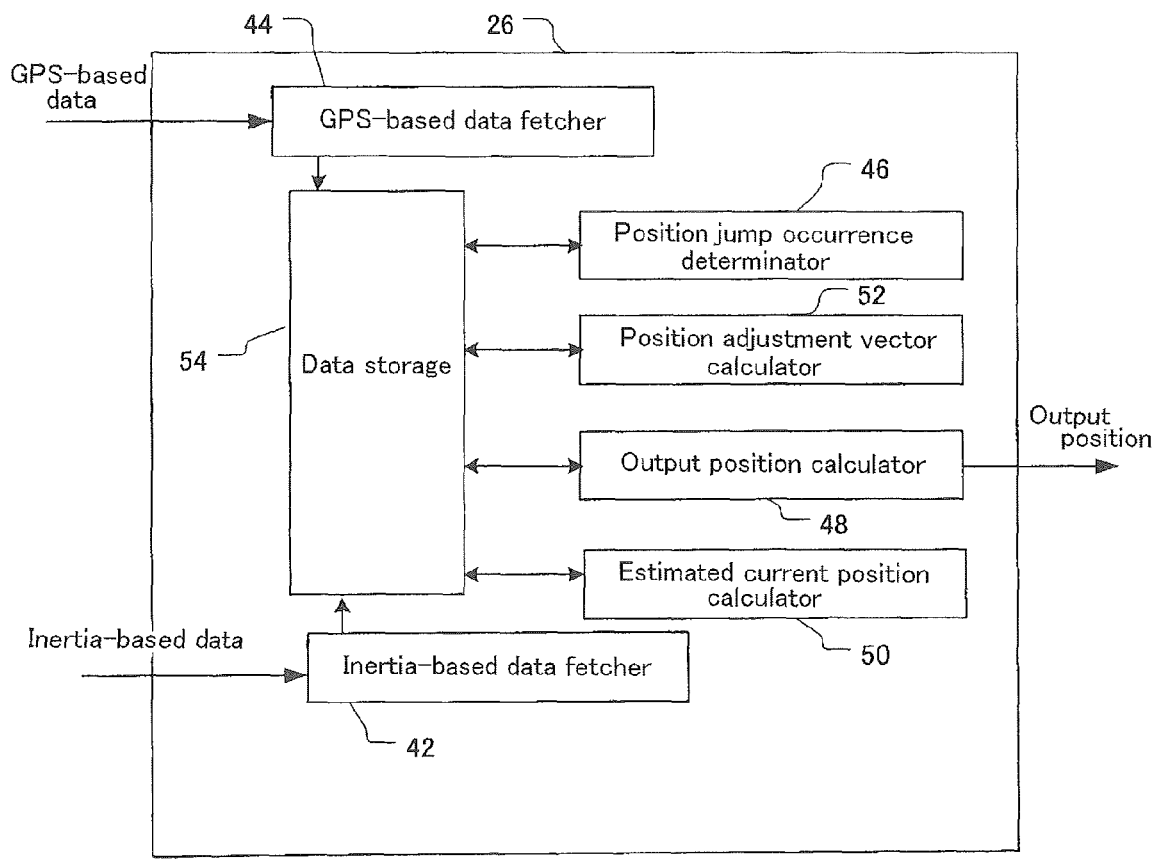
FIG. 6 is a block diagram showing the position output device in accordance with the first embodiment of the present invention.

For this purpose, a position determination system, including a position output device according to the present invention, is provided with an inertial measurement device 24, which is a component of an inertial navigation system. As shown in FIG. 6, the position output device 26 also provides an additional functionality of an inertia-based data fetcher 42.

Figure 7:
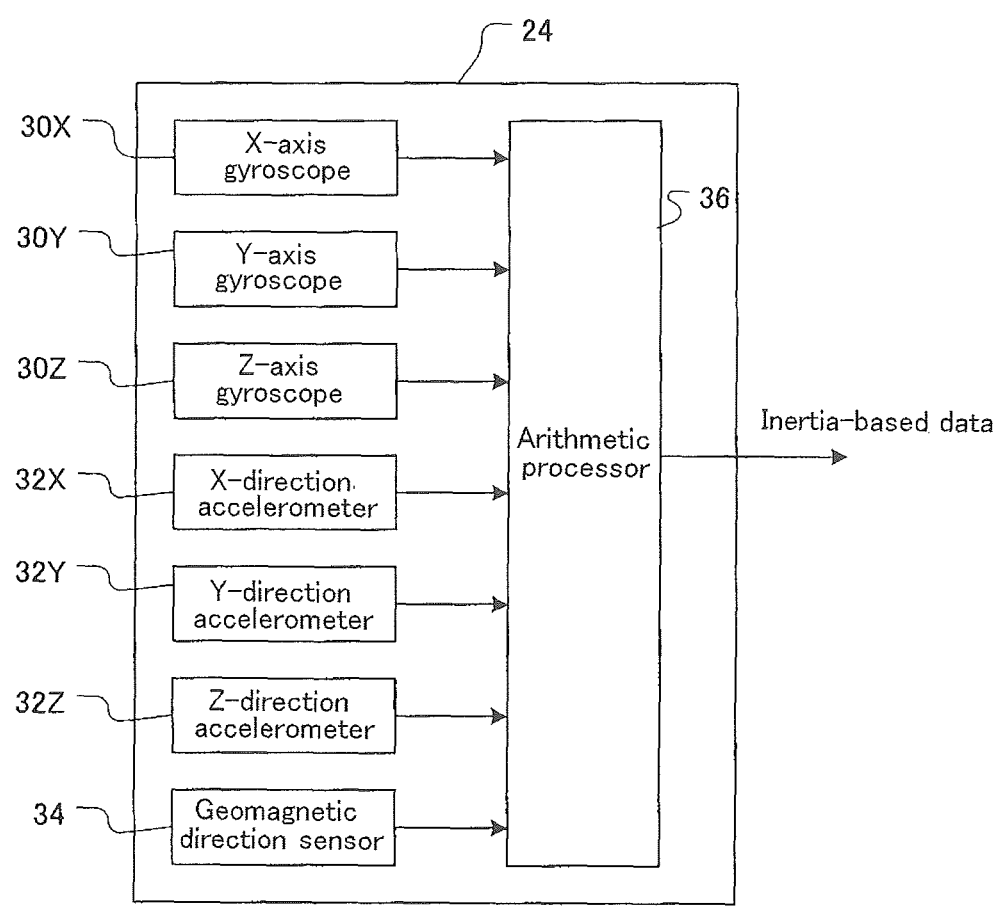
FIG. 7 is a block diagram showing an inertial measurement device.

As shown in FIG. 7, the inertial measurement device 24 includes three gyroscopes 30X, 30Y and 30Z for detecting the angular velocities about three axes, respectively, three accelerometers 32X, 32Y and 32Z for detecting the accelerations in the directions of three axes, respectively, a geomagnetic direction sensor 34 for detecting geomagnetic azimuth, and an arithmetic processor 36.

The arithmetic processor 36 performs its own processes repetitively at a fixed update interval $T_{INS}$. The processes include i) receiving respective gyroscope signals from the three gyroscopes 30X, 30Y and 30Z, respective acceleration signals from the three accelerometers 32X, 32Y and 32Z and a geomagnetic direction signal from the geomagnetic direction sensor 34, conducting calculations for a coordinate transformation matrix from body-fixed coordinates which is fixed to the body of the moving object (and thus to the gyroscopes and the sensors mounted on the moving object) into earth-fixed, local coordinates (in which the X-direction is fixed to the north-direction and the Z-direction to the gravitational direction), conducting calculations for integrations of the acceleration signals to derive the velocity of the moving object (referred to as the "inertia-based velocity $V_{INS}$" hereinafter), iv) conducting calculations for integration of the velocity to derive the position of the moving object (referred to as the "inertia-based position" hereinafter), and outputting the thus derived position of the moving object.

When the calculations for the coordinate transformation matrix is conducted by the arithmetic processor 36, it is preferable to conduct additional arithmetic operations for eliminating leveling errors and azimuthal errors, such as disclosed by Japanese patent publication No. 4615287. According to the disclosure of the publication, leveling errors may be eliminated by compensating the effects of the accelerations in the motion of the moving object, which may be conducted based on i) the gravitational accelerations detected by the accelerometers 32X, 32Y and 32Z and the GPS-based determined velocity $V_{GPS}$ of the moving object available from the GPS receiver 22. It is also disclosed that azimuthal errors may be eliminated by compensation to be conducted based on i) the GPS-based direction available from the GPS receiver 22 and the geomagnetic direction available from the geomagnetic direction sensor 34.

Figure 8:
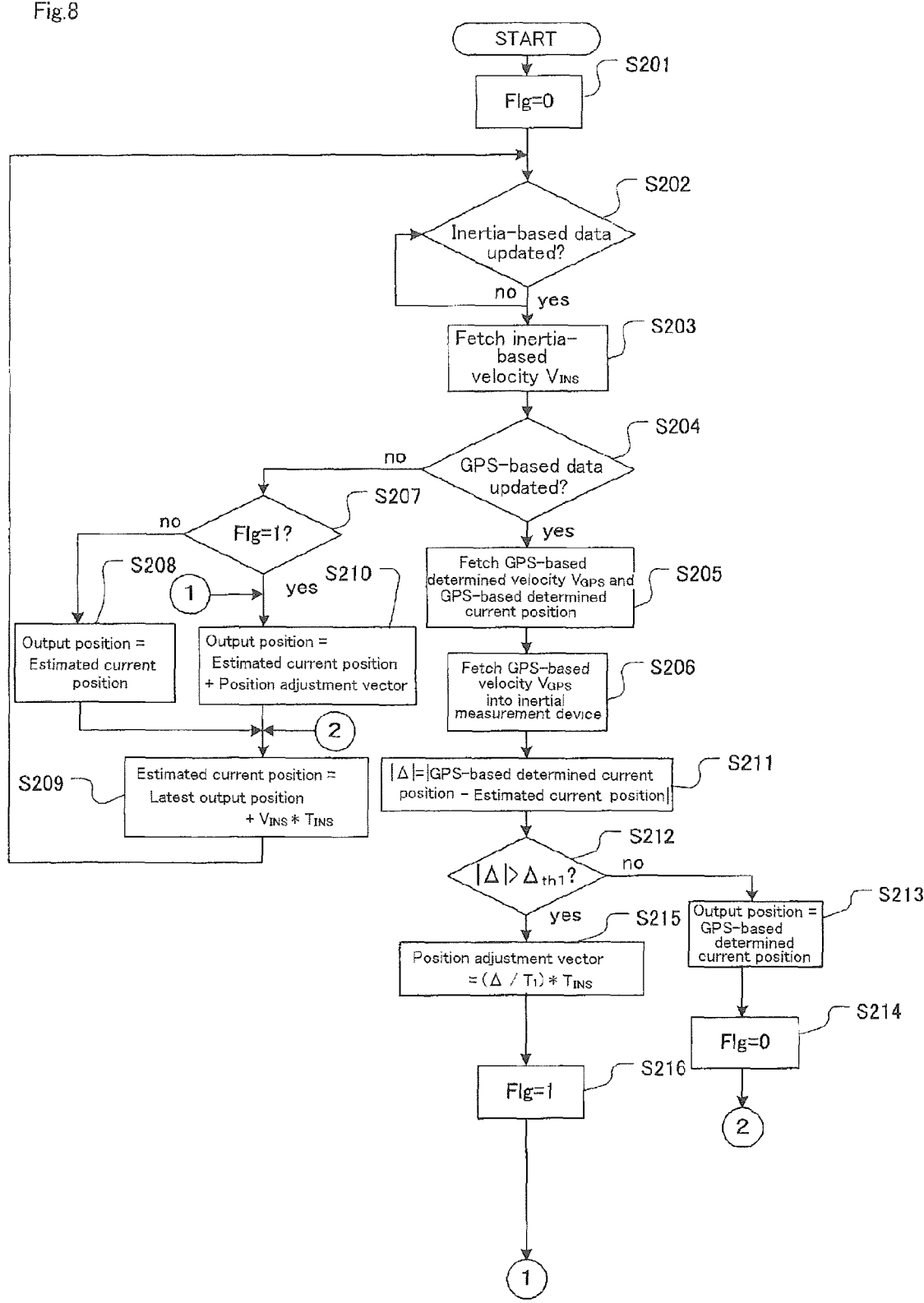
FIG. 8 is a flowchart showing the process performed by the position output device in accordance with the second embodiment.

Referring next to FIG. 8, the process performed by the functional components of the position output device 26 will be described mainly with respect the differences between this process and that shown in FIG. 3.

In this exemplified process, a position jump occurrence flag Flg is introduced, which is reset to "0" at Step S201. When the value of the position jump occurrence flag is "1", it indicates that a position jump has occurred. When the value is "0", it indicates that no position jump has occurred.

Thereafter, the inertia-based data fetcher 42 fetches the inertia-based data from the inertial measurement device 24 into the position output device 26 and stores it into the data storage 54 at Steps S202 and S203. The inertia-based data includes the inertia-based velocity $V_{INS}$, which is updated at a fixed update interval $T_{INS}$ of the inertia-based data.

Then, the GPS-based data fetcher 44 fetches the GPS-based data from the GPS receiver 22 into the position output device 26 and stores it into the data storage 54 (Steps S204 and S205). The GPS-based data is updated at a fixed update interval $T_{GPS}$ and includes the GPS-based determined velocity $V_{GPS}$, the GPS-based determined direction and the GPS-based determined current position. The GPS-based determined velocity $V_{GPS}$ thus fetched into the position putout device 26 is further fetched therefrom into the inertial measurement device 24 at Step S206, where it is used for compensation of the latter, as described above.

If it is determined that a new update of the GPS-based data from the GPS receiver 22 has not occurred since the latest detected update (No branch from Step S204) and that no position jump has occurred at the latest detected update of the GPS-based data (NO branch from Step S207), then, the process proceeds to Step S208, where the latest estimated current position, which has been generated by the estimated current position calculator 50, is used by the output position calculator 48 as a new output position, so that the latest estimated current position is selected as the new output position (Step S208).

Thereafter, a new estimated current position of the moving object, which may be used at the next update time, is generated by the estimated current position calculator 50 and stored into the data storage 54. The new estimated current position is generated based on the latest output position, the inertia-based determined velocity $V_{INS}$, and the update interval $T_{INS}$, by calculation using formula (4) below (Step S209).

$$\text{Estimated current position} = \text{Latest output position} + V_{INS}*T_{INS} \quad (4)$$

Note that the inertia-based determined velocity $V_{INS}$ in this formula is a vector quantity.

Alternatively, the estimated output position calculator 50 may fetch an inertia-based determined current position, which is generated by the arithmetic processor 36 at every update time, and either use the inertia-based determined current position as the new estimated current position or generate a new estimated current position based on the inertia-based determined current position.

Whenever the GPS-based data from the GPS receiver 22 is updated, the position jump determinator 46 is activated to determine whether or not a position jump has occurred at the new update (Steps S211 and S212). If it is determined that no position jump has occurred at the new update, and further, if it is determined that no position jump has occurred at the previous update so that the position jump occurrence flag Flg has been set to "0", then i) the new GPS-based determined current position itself is used as a new output position, so that the new GPS-based determined current position is selected to be the new output position (Step S213), ii) the position jump occurrence flag Flg is reset to "0" (Step S214), and iii) a new estimated current position is generated by calculation using formula (4) above (Step S209).

With the following iteration of this process, as long as no position jump has occurred at a new update of the GPS-based data, the output position calculator 48 i) uses the new GPS-based determined current position as a new output position whenever the GPS-based data is updated (Step S213) and uses the new estimated current position whenever the inertia-based data is updated without update of the GPS-based data (Step S208). This means that additional output positions are interpolated, based on the inertia-based data provided from the inertial measurement device 24, between two output positions corresponding to two successive GPS-based determined current positions.

On the other hand, if a position jump has occurred at a new update of the GPS-based data, then the position adjustment vector calculator 52 is activated to generate a position adjustment vector (Step S215).

More particularly, the position adjustment vector can be generated by calculation using formula (5) below.

$$\text{Position adjustment vector} = (\Delta/T_1)*T_{INS} \quad (5)$$

Note that $\Delta$ in this formula is a vector quantity.

Thereafter, the position jump occurrence flag Flg is set to "1" (Step S216), and the output position calculator 48 is activated to generate a new output position based on the latest estimated current position and the position adjustment vector (Step S210).

During a period of time from an update of the GPS-based data at which a position jump has occurred to the next update of the GPS-based data, the latest estimated current position adjusted with the position adjustment vector generated by calculation using formula (5) above is repetitively used as the output position at every update of the inertia-based data (Step S210), so that a series of such output positions are used for interpolation. Note that the position adjustment vector remains unchanged during the period of time between two successive updates of the GPS-based data.

Figure 9:
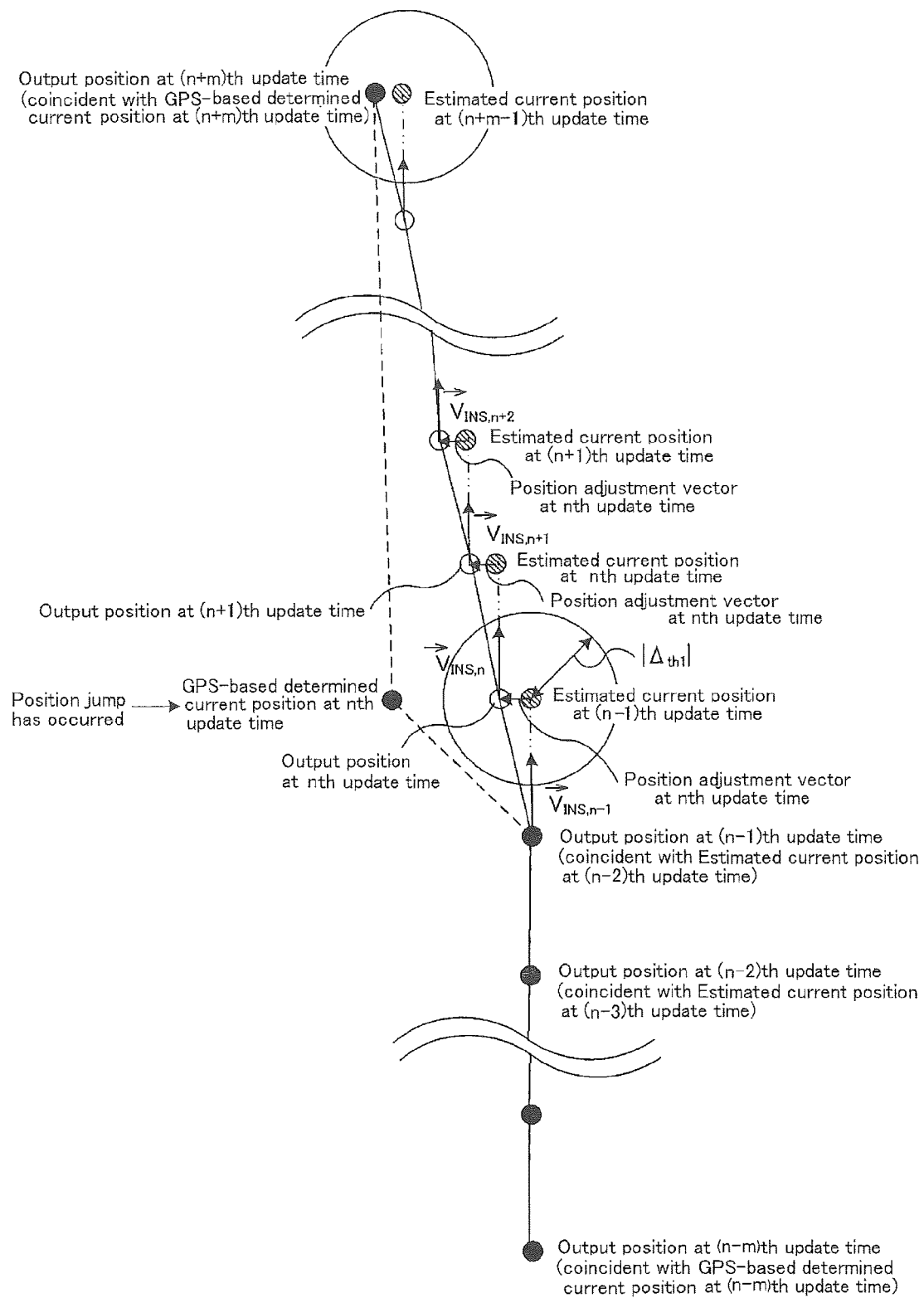
FIG. 9 is a schematic diagram showing an example of successive output positions, which may be outputted from the position output device in accordance with the first embodiment.

FIG. 9 shows a series of successive displacements of output positions, which may be obtained by iteration of the above process. In the drawing, (n) is a serial number identifying each particular update of the output position. No position jump has occurred till the nth update. Also, no update of the GPS-based determined current position has occurred since the (n−m+1)th update till the nth update, so that estimated current positions are used as output positions at the intervening updates between them. At the nth update, an update of the GPS-based determined current position has occurred with a position jump. As the consequence, if it is determined that a position jump has occurred, so that such a position that is advanced from the latest estimated current position by the position adjustment vector toward the new (i.e., updated)

GPS-based determined current position. At the following (n+1)th update, another new output position is generated and used as the output position. At the following (n+1)th update, another such a position is generated and used as the output position, which is closer to the corresponding GPS-based determined current position than the preceding output position is. Finally, at the (n+m)th update, when no longer a position jump has occurred, so that the GPS-based determined current position is again used as the output position.

The second embodiment described above provides not only the functionalities and the advantageous effects achievable by the first embodiment, but also an additional functionality of interpolating additional output positions between two successive updates of the GPS-based data, so that the output position can follow any abrupt variation of the position of a moving object.

(Third Embodiment)

Figure 10:
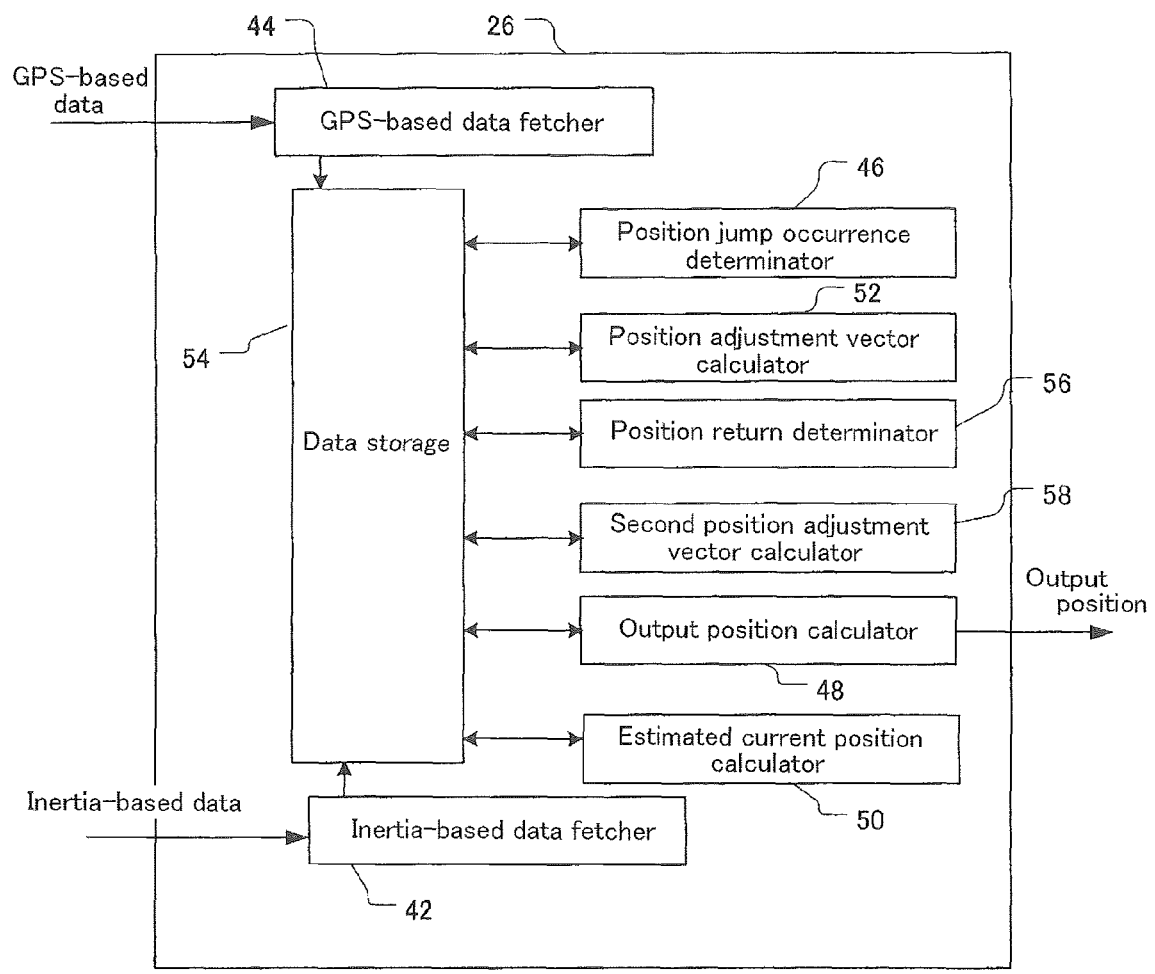
FIG. 10 is a block diagram showing a position output device in accordance with a third embodiment of the present invention.
Figure 11:
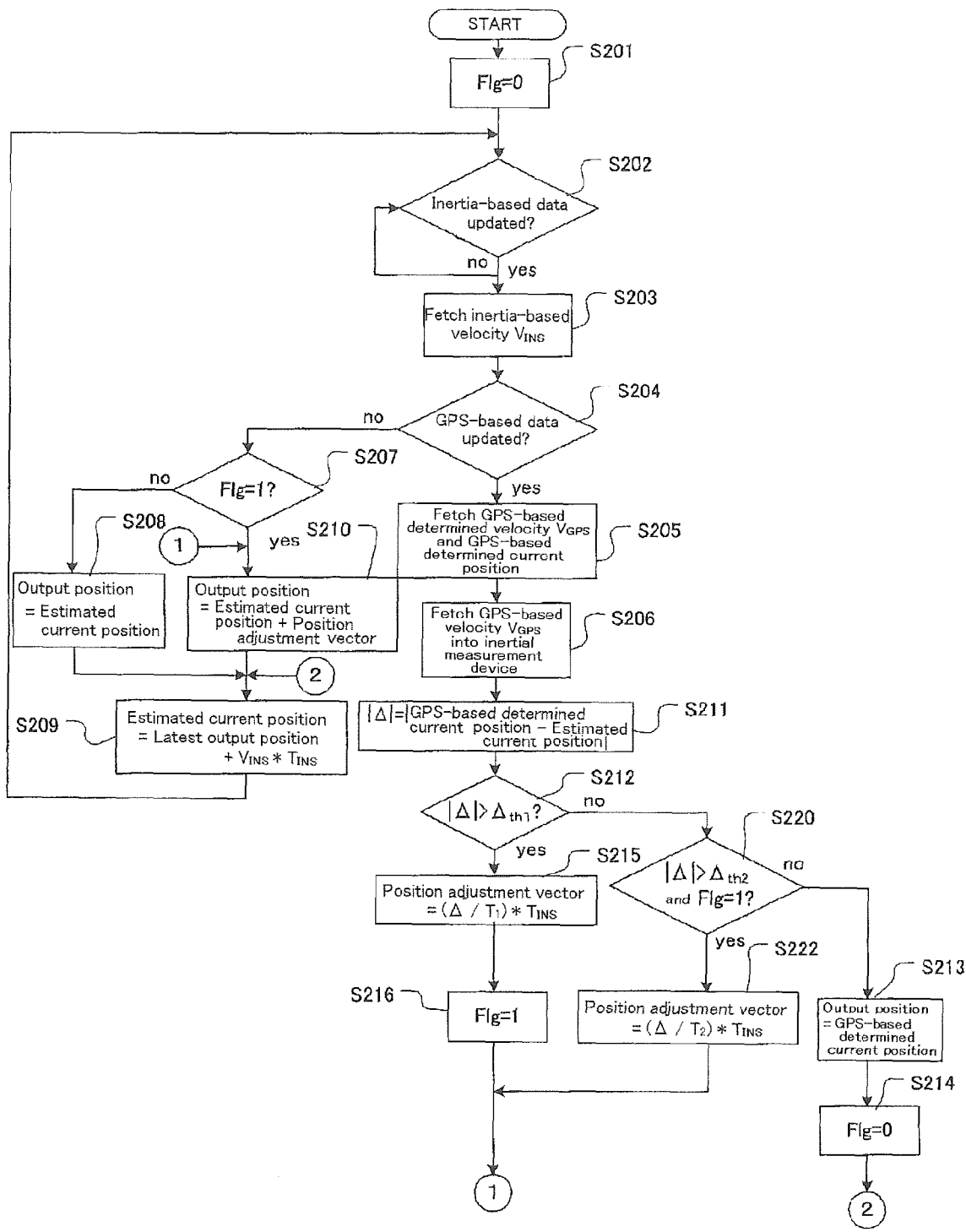
FIG. 11 is a flowchart showing the process performed by the position output device in accordance with the third embodiment.
Figure 12:
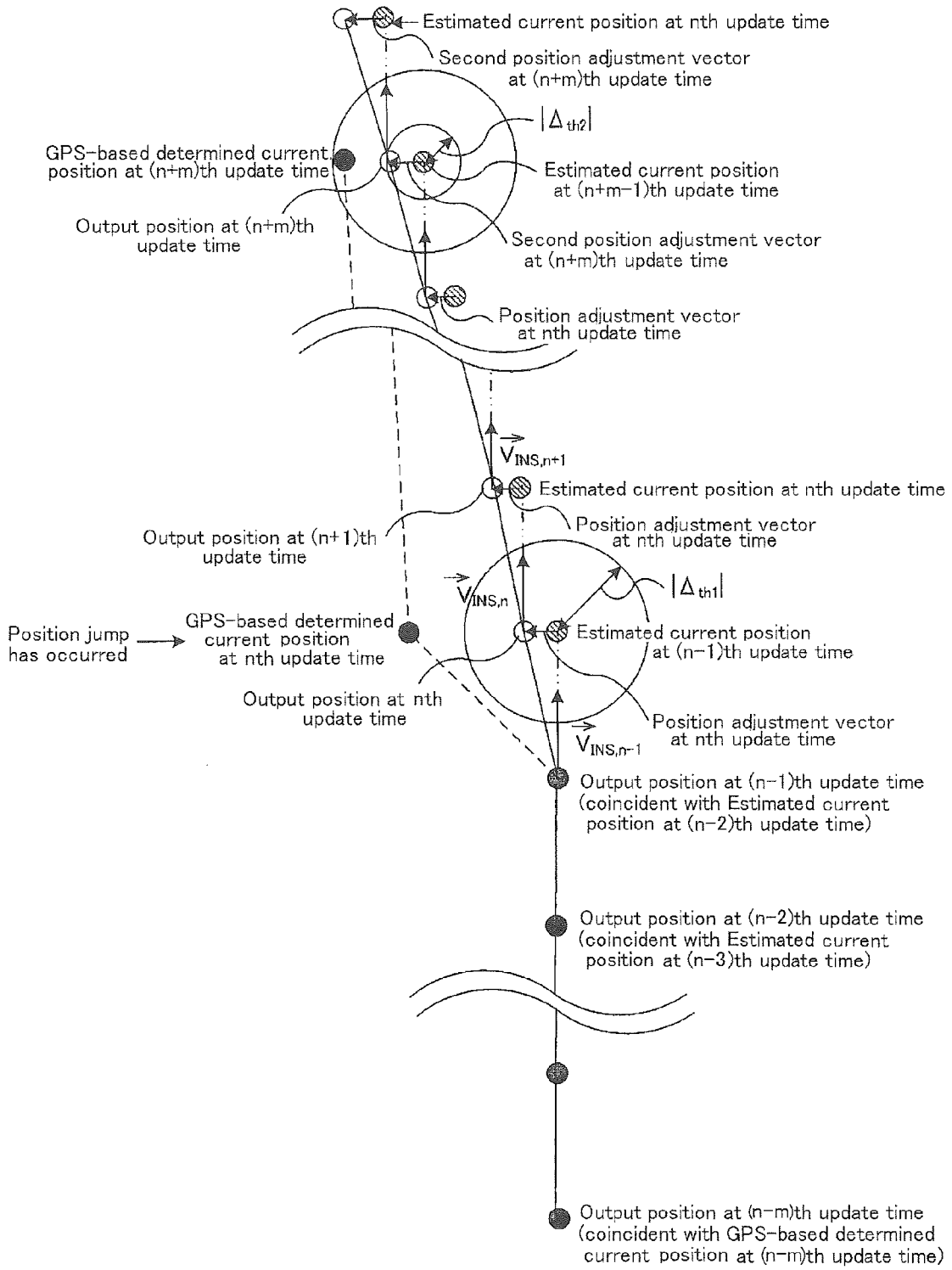
FIG. 12 is a schematic diagram showing an example of successive output positions, which may be outputted from the position output device in accordance with the first embodiment.

FIGS. 10 through 12 show a third embodiment. Among its functional components, those which are the same as or similar to the components of the first or second embodiments are indicated with the same reference numerals and will not be described in detail.

With the third embodiment, the displacements between successive output positions may be made more moderate. The current position output device 26 includes two additional functional components: a position return determinator 56 and a second position adjustment vector calculator 58.

With the second embodiment, an abrupt displacement between successive output positions may possibly occur when the output position calculator 48 starts using the GPS-based determined current position as the output position, which situation arises when the distance |Δ| between the GPS-based determined current position and the estimated current position has reduced again below the threshold distance Δth1 after an occurrence of a position jump, that is, when the position jump has disappeared by, for example, the adjustment effected to the output position or the end of any abnormalities in the GPS operation.

In view of the above, the third embodiment is so constructed such that adjusted positions continue being outputted even after disappearance of the position jump for which the adjusted positions started being outputted. They continue being outputted until the distance |Δ| between a new GPS-based determined current position and the latest estimated current position reduces below another threshold distance $\Delta_{th2}$ smaller than the threshold distance $\Delta_{th1}$. It is preferable in this relation that an additional adjustment be effected to make the adjusted position get coincident with the GPS-based determined position more quickly.

More particularly, when it is determined by the position jump occurrence determinator 46 that no position jump has occurred at a new update (that is, formula (1) does not hold for the new update) (Step S212), then, the position return determinator 56 is activated to determine whether or not both of the following two conditions hold: i) the position jump occurrence flag Flg has been set to "1"; and the distance |Δ| between the new GPS-based determined current position and the latest estimated current position is greater than a predetermined second threshold distance $\Delta_{th2}$ ($<\Delta_{th1}$, a few centimeters, for example) (Step S220). If so, then the second position adjustment vector calculator 58 is activated to generate, by calculation, a second position adjustment vector (Step S222).

The second position adjustment vector is so generated as to have a magnitude of such a length: if the distance |Δ| between the estimated current position and the GPS-based determined current position is repetitively reduced by this length at each successive update time, then the distance |Δ| is reduced to zero after a second predetermined time period $T_2$ which is longer than the update interval $T_{INS}$ and shorter than the above mentioned first predetermined time period $T_1$ (that is, $T_2 < T_1$). Accordingly, the second position adjustment vector can be generated by calculation using formula (6) below.

$$\text{Second position adjustment vector} = (\Delta/T_2) * T_{INS} \quad (6)$$

Note that Δ in this formula is a vector quantity.

Thereafter, at a certain update, the difference |Δ| between the GPS-based determined current position and the estimated current position is reduced below the second predetermined threshold distance $\Delta_{th2}$ (NO branch from Step S220), when the output position calculator 48 uses the new GPS-based determined current position as the output position, so that the output position is again coincident with the GPS-based determined current position (Step S213). Thereafter, the position jump flag Flg is reset to "0" (Step S214).

FIG. 12 shows an example of a series of displacements between successive output positions, which may be obtained by iteration of the above process. In the drawing, (n) is a serial number identifying each particular update of the output position. After a position jump has occurred, the difference |Δ| between the GPS-based determined current position and the estimated current position is reduced below the first threshold distance |$\Delta_{th1}$| but is still greater than the second threshold distance |$\Delta_{th2}$| at the (n+m)th update, when adjustment is effected with the second position adjustment vector that is greater than the first position adjustment vector. In this manner, the output position is again coincident with the GPS-based determined current position, while the displacements are made to be more moderate than those with the first and second embodiments.

Note that the position return determinator 56 and the second position adjustment vector calculator 58 may be incorporated into the first embodiment although it utilizes no inertia-based data.

LIST OF REFERENCE NUMERALS 26 position output device
42 inertia-based data fetcher (inertial navigation system-based data fetcher)
44 GPS-based data fetcher (satellite navigation system-based data fetcher)
46 position jump occurrence determinator
48 output position calculator
50 estimated current position calculator
52 position adjustment vector calculator
56 position return determinator
58 second position adjustment vector calculator
$T_1$ first predetermined time period
$T_2$ second predetermined time period
$T_{GPS}$ update interval of GPS-based data
$T_{INS}$ update interval of inertial navigation system-based data

What is claimed is:

1. A position output device for outputting position data indicating a current position of an object, based on position data of a determined current position of the object as determined by a satellite navigation system, comprising:
   a satellite navigation system-based data fetcher for fetching, into the position output device, a satellite navigation system-based determined current position which is being updated by the satellite navigation system;

an output position calculator for successively generating, by calculation, an output position to be outputted at each successive update time;

an estimated current position calculator for generating, by calculation, an estimated current position of the object, based on the latest output position outputted at the latest update time;

a position jump occurrence determinator for determining whether or not a position jump has occurred, based on the distance between the estimated current position and the satellite navigation system-based determined current position;

a position adjustment vector calculator for generating, by calculation, a position adjustment vector for use in effecting adjustment to the satellite navigation system-based determined current position, the position adjustment vector calculator being adapted to be activated when it is determined that a position jump has occurred;

a position return determinator for determining whether or not the distance between the estimated current position and the satellite navigation-system based determined current position is greater than a predetermined threshold distance, the position return determinator being adapted to be activated when it is determined that no position jump has occurred after occurrence of a position jump;

a second position adjustment vector calculator for generating, by calculation, a second position adjustment vector for use in effecting adjustment to the satellite navigation system-based determined current position, the second position adjustment vector calculator being adapted to be activated when it is determined that the distance between the estimated current position and the satellite navigation-system based determined current position is greater than the predetermined threshold distance;

the position adjustment vector calculator being adapted to generate the position adjustment vector having a magnitude of such a length: if the distance between the estimated current position and the satellite navigation system-based determined current position is reduced by this length at each successive update time, then that distance is reduced to zero after a predetermined time period which is longer than the update interval;

the second position adjustment vector calculator being adapted to generate the second position adjustment vector having a magnitude of such a length: if the distance between the estimated current position and the satellite navigation system-based determined current position is repetitively reduced by this length at each successive update time, then that distance is reduced to zero after a predetermined time period which is longer than the update interval and shorter than the above mentioned predetermined time period for the position adjustment vector calculator; and the output position calculator being adapted to generate such an output position that corresponds to the estimated current position adjusted with the position adjustment vector when it is determined that a position jump has occurred and to generate such an output position that corresponds to the estimated current position adjusted with the second position adjustment vector when it is determined that no position jump has occurred after occurrence of a position jump and that the distance between the estimated current position and the satellite navigation-system based determined current position is greater than a predetermined threshold distance.

2. The position output device using a satellite navigation system according to claim 1, wherein:

the position adjustment vector has a magnitude which corresponds to the distance between the estimated current position and the satellite navigation system-based determined current position, multiplied by the quotient of the length of the update interval divided by the length of a first time period.

3. The position output device using a satellite navigation system according to claim 2, wherein:

the second position adjustment vector has a magnitude which corresponds to the distance between the estimated current position and the satellite navigation system-based determined current position, multiplied by the quotient of the length of the update interval divided by the length of a second time period, wherein the second time period is shorter than the first time period.

4. The position output device using a satellite navigation system according to claim 1, further comprising:

an inertial navigation system-based data fetcher for fetching, into the position output device, an inertial navigation system-based determined velocity which is being updated by the inertial navigation system;

the estimated current position calculator being adapted to generate, by calculation, the estimated current position based on the inertial navigation system-based determined velocity.

5. The position output device using a satellite navigation system according to claim 1, wherein:

the output position calculator is adapted to use the estimated current position as a new output position when the position jump occurrence determinator determines that no position jump has occurred while the satellite navigation system-based determined position has not been updated.

6. The position output device using a satellite navigation system according to claim 1, wherein:

the output position calculator is adapted to use the estimated current position as a new output position when the position jump occurrence determinator determines that no position jump has occurred while the satellite navigation system-based determined position has been updated.

7. The position output device using a satellite navigation system according to claim 1, wherein, when the position jump occurrence determinator determines that the position jump has not occurred, then the position jump occurrence determinator makes a determination using a threshold distance which is different from the determination of the position jump is made.

8. The position output device using a satellite navigation system according to claim 1, wherein the output position calculator generates the output position until a difference between the estimated current position and the satellite navigation system-based determined current position is below the predetermined threshold distance.

9. The position output device using a satellite navigation system according to claim 1, wherein the position adjustment vector calculator generates a series of adjusted positions after occurrence of the position jump at a certain update of the satellite navigation system-based determined current position over a period of time greater than the update interval for the satellite navigation system-based determined current position.

10. The position output device using a satellite navigation system according to claim 2, wherein:
the output position calculator is adapted to use the estimated current position as a new output position when the position jump occurrence determinator determines that no position jump has occurred while the satellite navigation system-based determined position has not been updated.

11. The position output device using a satellite navigation system according to claim 3, wherein:
the output position calculator is adapted to use the estimated current position as a new output position when the position jump occurrence determinator determines that no position jump has occurred while the satellite navigation system-based determined position has not been updated.

12. The position output device using a satellite navigation system according to claim 4, wherein:
the output position calculator is adapted to use the estimated current position as a new output position when the position jump occurrence determinator determines that no position jump has occurred while the satellite navigation system-based determined position has not been updated.

13. The position output device using a satellite navigation system according to claim 2, wherein:
the output position calculator is adapted to use the estimated current position as a new output position when the position jump occurrence determinator determines that no position jump has occurred while the satellite navigation system-based determined position has been updated.

14. The position output device using a satellite navigation system according to claim 3, wherein:
the output position calculator is adapted to use the estimated current position as a new output position when the position jump occurrence determinator determines that no position jump has occurred while the satellite navigation system-based determined position has been updated.

15. The position output device using a satellite navigation system according to claim 4, wherein:
the output position calculator is adapted to use the estimated current position as a new output position when the position jump occurrence determinator determines that no position jump has occurred while the satellite navigation system-based determined position has been updated.

16. The position output device using a satellite navigation system according to claim 5, wherein:
the output position calculator is adapted to use the estimated current position as a new output position when the position jump occurrence determinator determines that no position jump has occurred while the satellite navigation system-based determined position has been updated.

* * * * *